US010424999B2

(12) United States Patent
Katada

(10) Patent No.: US 10,424,999 B2
(45) Date of Patent: Sep. 24, 2019

(54) LINEAR VIBRATION MOTOR

(71) Applicant: Nidec Copal Corporation, Tokyo (JP)

(72) Inventor: Yoshinori Katada, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 306 days.

(21) Appl. No.: 15/329,039

(22) PCT Filed: Jul. 27, 2015

(86) PCT No.: PCT/JP2015/071255
§ 371 (c)(1),
(2) Date: Jan. 25, 2017

(87) PCT Pub. No.: WO2016/017585
PCT Pub. Date: Feb. 4, 2016

(65) Prior Publication Data
US 2017/0214306 A1    Jul. 27, 2017

(30) Foreign Application Priority Data

Jul. 28, 2014   (JP) .................................. 2014-153355

(51) Int. Cl.
*H02K 33/16* (2006.01)
*B06B 1/04* (2006.01)

(52) U.S. Cl.
CPC ............ *H02K 33/16* (2013.01); *B06B 1/045* (2013.01)

(58) Field of Classification Search
CPC ........ H02K 33/00; H02K 33/02; H02K 33/06; H02K 33/16; H02K 7/083; B06B 1/045
See application file for complete search history.

(56) References Cited

U.S. PATENT DOCUMENTS 3,149,255 A * 9/1964 Trench .................. H02K 33/06
                                                                 310/30
5,434,549 A   7/1995 Hirabayashi et al.
(Continued)

FOREIGN PATENT DOCUMENTS

CN        102971947 A    3/2013
EP         580117 A2     1/1994
(Continued)

OTHER PUBLICATIONS

International Search Report (English and Japanese) and PCT Written Opinion (Japanese) dated Oct. 13, 2015 issued in corresponding PCT International Application No. PCT/JP2015/071255.

*Primary Examiner* — Dang D Le
(74) *Attorney, Agent, or Firm* — Troutman Sanders LLP

(57) ABSTRACT

The present invention makes thinness or widthwise compactness possible, while exhibiting the advantages of obtaining stable vibrations and excellent impact strength, just as in a linear vibration motor equipped with a fixed shaft. A linear vibration motor equipped with: a needle equipped with a magnet and a spindle part; a frame for slidably supporting the needle in one axial direction; a coil for driving the magnet in the one axial direction, and affixed to the frame; and an elastic member for imparting an elastic force to the needle in opposition to the driving force imparted on the magnet. Therein, the needle is equipped with a pair of shaft parts which project in opposite directions in the one axial direction, and the frame is equipped with bearings for slidably supporting the pair of shaft parts.

3 Claims, 8 Drawing Sheets

(56) References Cited

U.S. PATENT DOCUMENTS

| | | | |
|---|---|---|---|
| 8,188,623 B2 * | 5/2012 | Park | H02K 33/16 310/12.01 |
| 2013/0169071 A1 | 7/2013 | Endo et al. | |

FOREIGN PATENT DOCUMENTS

| | | |
|---|---|---|
| JP | S54121206 U | 8/1979 |
| JP | H079081 U | 2/1995 |
| JP | 2011097747 A | 5/2011 |
| JP | 2011205870 A | 10/2011 |
| JP | 2012016153 A | 1/2012 |
| KR | 2013-0111515 A | 10/2013 |
| TW | 201223083 A | 6/2012 |
| WO | 2012/002329 A1 | 1/2012 |

* cited by examiner

LINEAR VIBRATION MOTOR

CROSS-REFERENCE TO RELATED APPLICATIONS

This is a U.S. national phase application under 35 U.S.C. § 371 of International Patent Application No. PCT/JP2015/071255, filed Jul. 27, 2015, and claims benefit of priority to Japanese Patent Application No. 2014-153355, filed Jul. 28, 2014. The entire contents of these applications are hereby incorporated by reference.

FIELD

The present invention relates to a linear vibration motor for generating a vibration through causing a movable element to undergo reciprocating vibration linearly through a signal input.

BACKGROUND

A vibration motor (or a vibration actuator) is that which communicates, to a user of a communication device or to an operator who is holding any of a variety of electronic devices, the state of an input signal through a vibration, through generating a vibration through an incoming call on a communication device or through the transmission of an alarm on any of a variety of electronic devices, and is built into any of a variety of electronic devices, such as mobile information terminals, including mobile telephones.

Among the various types of vibration motors under development, there is a known linear vibration motor that is able to generate relatively large vibrations through linearly reciprocating vibrations. This linear vibration motor employs a structure that is provided with a straight stationary shaft, and a movable element is vibrated therealong, making it possible to achieve stabilized vibration with little noise produced by components striking each other, and making it possible to achieve resistance to damage, such as when there is a drop impact, through the movable element being held by the stationary shaft.

In the prior art for linear vibration motors that are equipped with stationary shafts there have been proposals for those wherein a driving portion is structured from a coil that is secured to a case and a magnet that is disposed within the coil, a movable element is structured through connecting a weight portion to the magnet along the direction of vibration, a through hole is formed in the movable element along the direction of vibration, and a single stationary shaft is passed through this through hole (See, for example, Japanese Unexamined Patent Application Publication No. 2012-16153), or two stationary shafts are provided along the direction of vibration, a driving portion made from a coil and a magnet is disposed between the two stationary shafts, and a movable element that is provided with a weight portion and which is driven by the driving portion is supported by the two stationary shafts so as to be able to slide (See, for example, Japanese Unexamined Patent Application Publication No. 2011-97747), and the like. In each of these prior art technologies, coil springs are provided around the stationary shaft, and the movable element is caused to undergo reciprocating vibration along the stationary shaft through the driving force by the driving portion in one direction and the elastic force of the coil spring in opposition to the driving force.

SUMMARY

With smaller and thinner mobile electronic devices there is the need for smaller and thinner vibration motors to be equipped therein. In particular, in electronic devices such as smart phones that are equipped with flat panel displaying portions, space within the devices is limited in the direction of thickness, perpendicular to the plane of the display, so there is a strong need for thinner vibration motors to be equipped therein.

When one considers reducing the thickness of a linear vibration motor that is provided with a stationary shaft, in the first of the prior art technologies described above, a through hole is formed along the direction of vibration in a movable element wherein a weight portion is connected to a magnet along the direction of vibration, but because a through hole is formed in the magnet itself, this requires the magnet to be adequately thick, in respect to the diameter of the stationary shaft, in order to secure an adequate volume for the magnet, to thereby produce the desired driving force. Moreover, the driving portion is structured through the provision also of a coil around the magnet, and thus there is a problem in that this is not completely compatible with reducing thickness. Moreover, while one may consider forming the through hole in the magnet itself through dividing into magnets on the left and the right of the stationary shaft, this would increase the number of components for the magnet, not only preventing good manufacturability, but also producing a problem in that it would be difficult to secure the magnet volume for producing an adequate driving force.

In contrast, if two stationary shafts are provided and a driving portion is provided therebetween, as in the latter of the prior art technologies described above, it would not be necessary to form a through hole through the magnet, thus enabling the magnet to be made thinner. However, because two stationary shafts are provided, on both sides of the magnet, a problem is produced in that the width of the linear vibration motor is wide. In recent years there have been requests for linear vibration motors that are to be installed in miniaturized electronic devices to be more compact, not only in the thickness direction, but in the width direction as well.

Moreover, because in both of the prior art technologies set forth above coil springs are provided around the stationary shafts, of necessity the diameters of the coil springs must be larger than the diameters of the stationary shafts. Because the diameters of the stationary shafts must, to some degree, be large to facilitate processing of components and in order to produce a stabilized vibration, there is a problem in that the provision of coil springs with diameters even larger than those would cause a reduction in thickness difficult.

In the present invention, the handling of such problems is an example of the problem to be solved. That is, objects of the present invention include the ability to reduce the thickness or the size in the width direction while also obtaining the benefit of superior ability to withstand physical shocks along with the ability to produce stabilized vibrations such as in a linear vibration motor that is equipped with a stationary shaft, and further to enable a reduction in thickness or a reduction in size in the width direction without increasing the number of magnet components and while preventing a reduction in volume of the magnet.

Means for Solving the Problem

In order to achieve such an object, the linear vibration motor of the present invention is equipped with the following structures:

A linear vibration motor comprising: a movable element that is provided with a magnet and a weight portion; a frame for containing the movable element; a coil, secured to the frame, for driving the magnet along the axial direction; and an elastic member for applying, to the movable element, an elastic force that opposes the driving force that is applied to the magnet, wherein: the movable element is provided with a pair of shaft portions that protrude in mutually opposing directions along the axial direction; and the frame is provided with respective bearing portions that support the pair of shaft portions so as to be able to slide.

DETAILED DESCRIPTION

Figure 1:
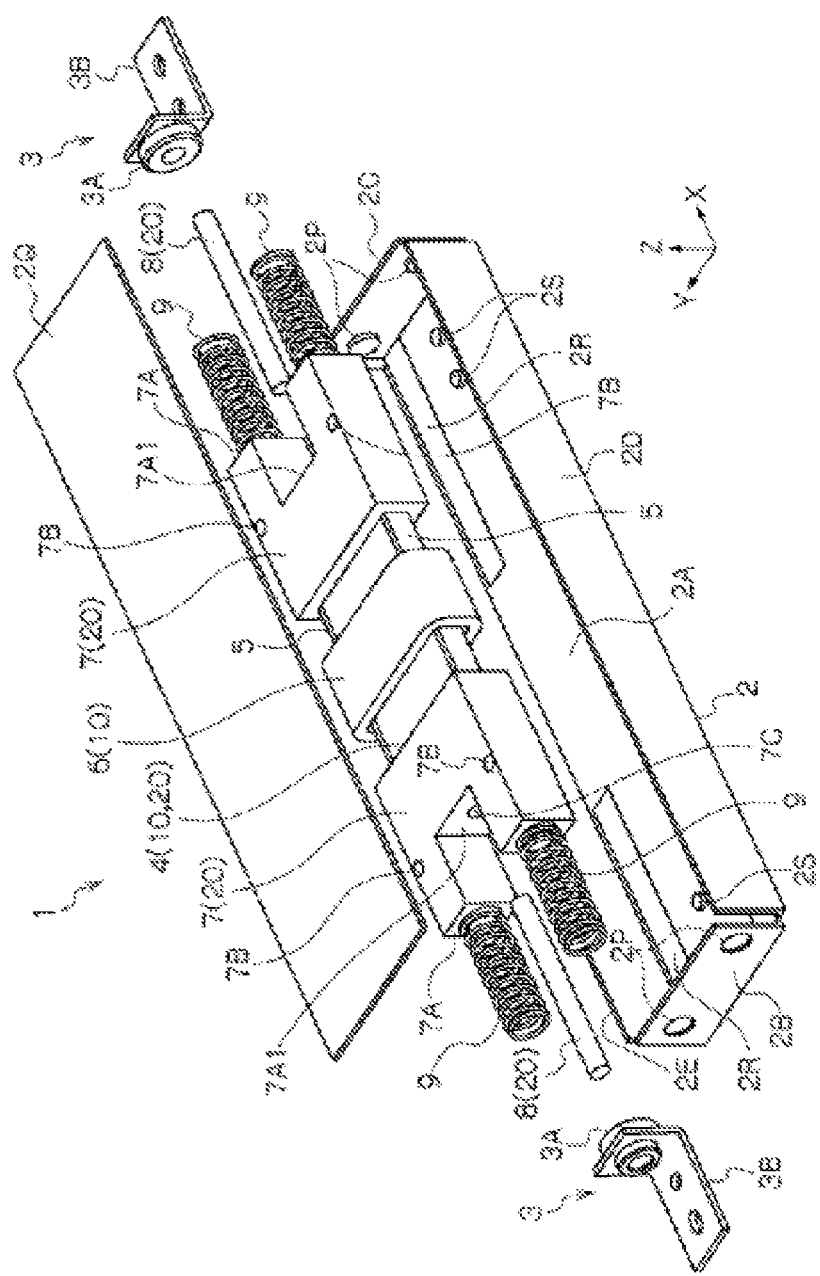
FIG. 1 is an assembly perspective diagram illustrating the overall structure of a linear vibration motor according to an example according to the present invention.
Figure 2:
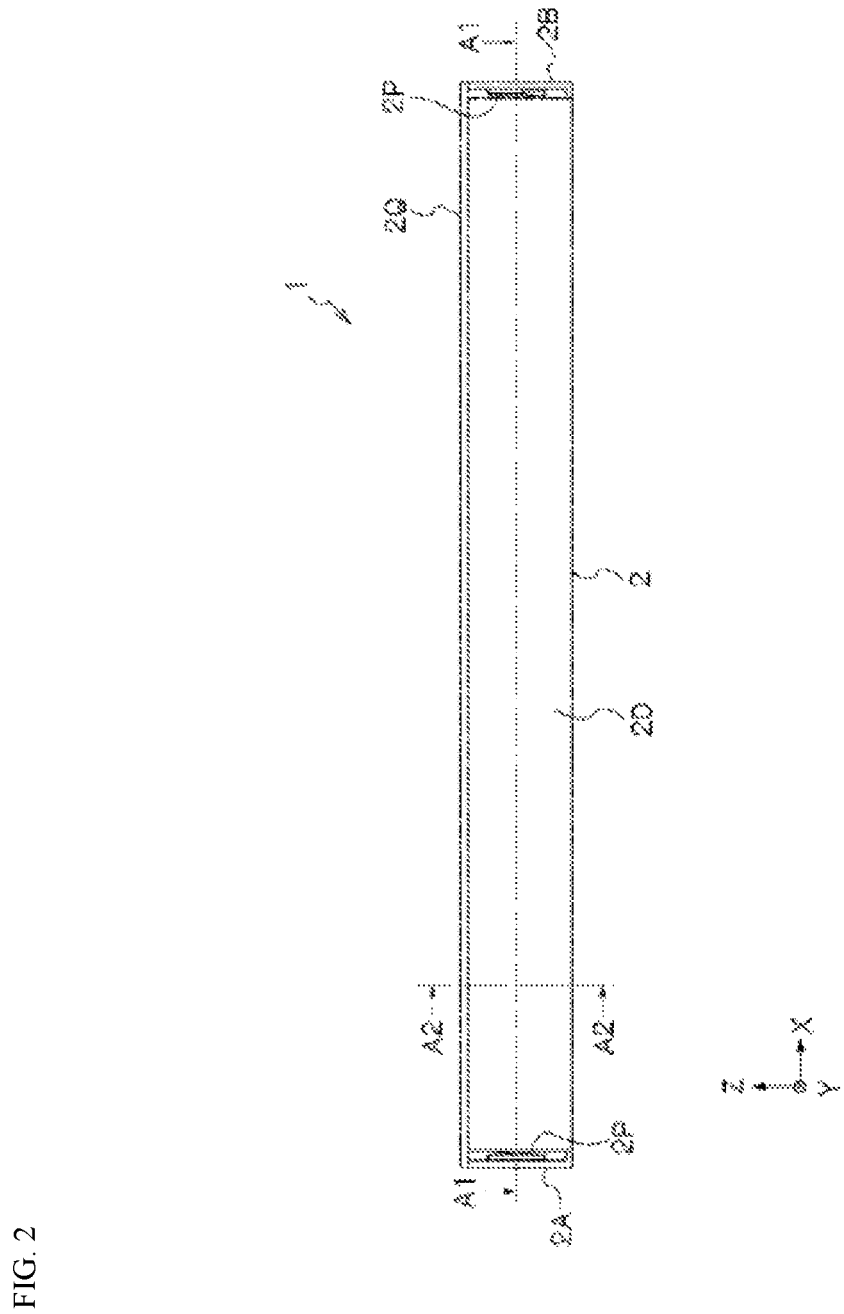
FIG. 2 is an explanatory diagram (an assembly side view diagram) illustrating the overall structure of a linear vibration motor according to an example according to the present invention.

Examples according to the present invention will be explained below in reference to the drawings (where identical reference symbols in different drawings below indicate identical positions, and redundant explanations in the various drawings are omitted). FIG. 1 through FIG. 4 illustrate the overall structure of a linear vibration motor according to one example according to the present invention. The X direction in each of the drawings indicates the direction of vibration (the axial direction), the Y direction indicates the width direction, and the Z direction indicates the thickness (height) direction.

A linear vibration motor 1 comprises: a movable element 20 that is provided with a magnet 4 and a weight portion 7; a frame 2 that supports the movable element 20 so as to be able to slide in the axial direction; a coil 6 that is secured to the frame 2, for driving the magnet 4 along the axial direction; and an elastic member 9 for applying, to the movable element 20, an elastic force that opposes the driving force applied by the magnet 4.

The frame 2 may have a frame structure that is able to contain the various portions; however, in the example that is illustrated, side walls 2B, 2C, 2D, and 2E are provided extending from the periphery of a rectangular bottom face 2A. Moreover, the frame 2, as necessary, is provided with a cover plate 2Q for covering that which is contained within the frame 2. The cover plate 2Q is formed in a rectangular plate shape that is attached to the top end faces of the side walls 2B through 2E. This frame 2 can be formed through machining a metal plate (for example, through performing a pressing process, or the like).

A driving portion 10 is structured from a coil 6 that is secured to the frame 2, and a magnet 4 that is a portion of the movable element 20. Lorentz forces that act on the magnet 4 through the application of the electric current to the stationary coil 6 act as driving forces that cause the movable element 20 to vibrate along the axial direction (the X direction in the figure).

Figure 3:
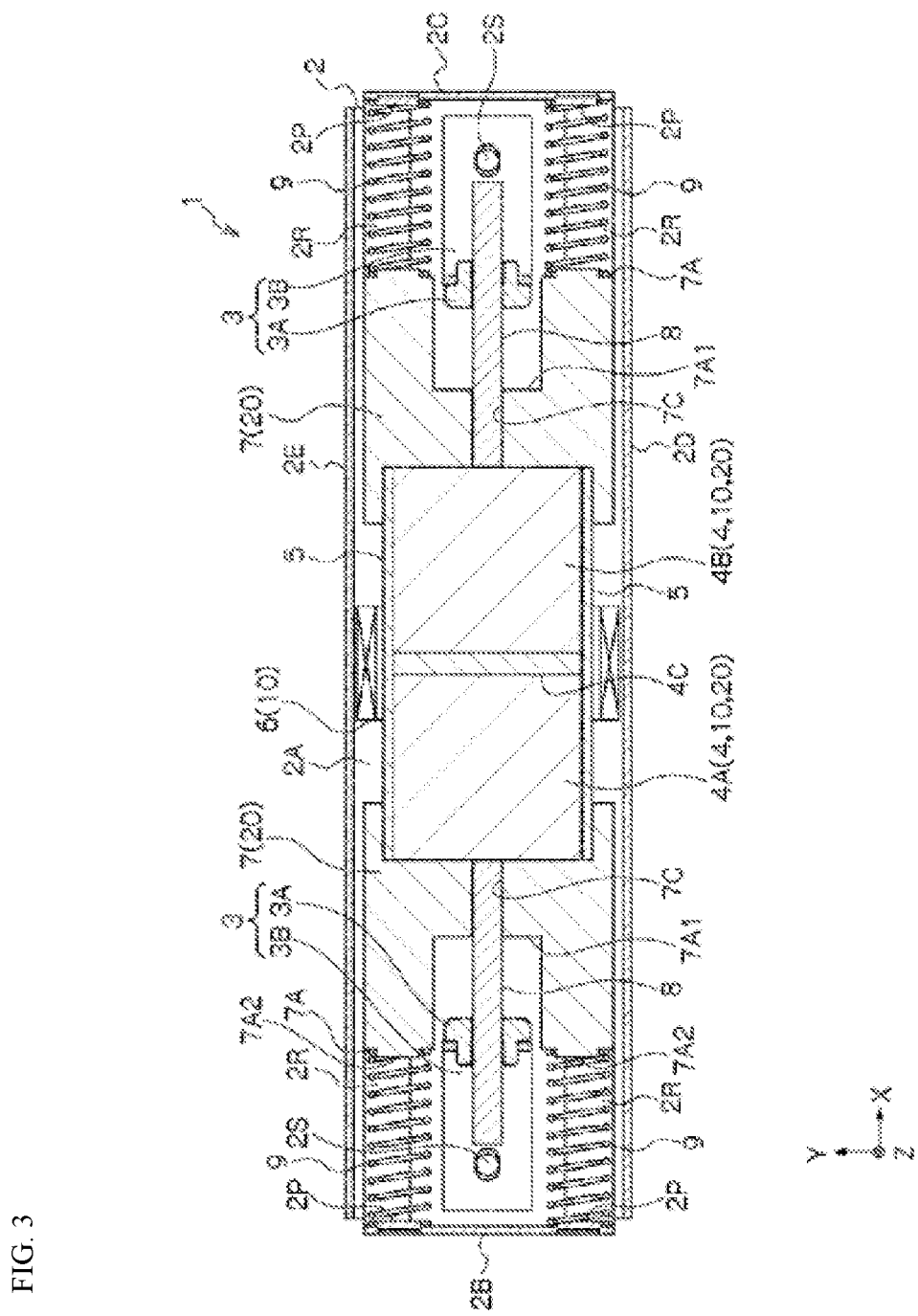
FIG. 3 is an explanatory diagram (a cross-sectional diagram along section A1-A1 in FIG. 2) illustrating the overall structure of a linear vibration motor according to an example according to the present invention.
Figure 4:
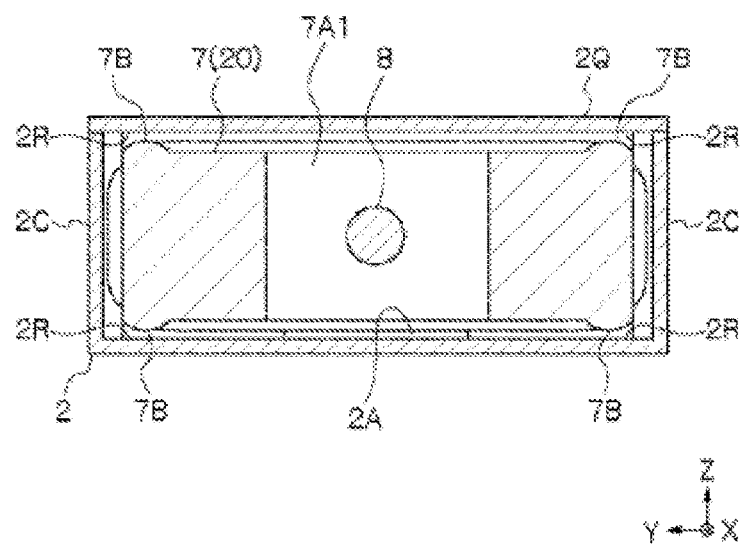
FIG. 4 is an explanatory diagram (a cross-sectional diagram along section A2-A2 in FIG. 2) illustrating the overall structure of a linear vibration motor according to an example according to the present invention.

As illustrated in FIG. 3, in the magnet 4, two flat rectangular magnet pieces 4A and 4B that have polarities along the axial direction (the X direction in the figure) are disposed with identical poles facing each other, connected with a spacer yoke 4C interposed therebetween. If necessary, a reinforcing plate 5 is secured to a side face of the magnet 4 to increase the rigidity of the magnet 4 thereby.

In the coil 6, an electric wire is wound along the Y and Z directions around the magnet 4 wherein the direction of the magnetic pole faces the X direction, with the top face and/or bottom face of the coil 6 and, if necessary, a side face thereof as well, secured to the inner surface of the frame 2. Securing of the coil 6 to the frame 2 may be through securing directly to the frame 2, or the coil 6 may be wound onto a coil bobbin with the coil bobbin secured to the frame 2.

In the example that is illustrated, in the movable element 20, weight portions 7 are connected to both end portions of the magnet 4 in the axial direction (the X direction in the figure). The weight portions 7 may be structured through, for example, a metal material with a high specific gravity, and in the example that is illustrated, are shaped essentially as rectangular solids wherein the height in the Z direction is greater than the thickness of the magnet 4, and the width in the Y direction is greater than the width of the magnet 4.

The movable element 20 is provided with a pair of shaft portions 8 that protrude in mutually opposing directions along the axial direction (the X direction in the figure). The shaft portions 8 are provided protruding in cantilever shapes from both axial-direction end portions of the movable element 20. In the example that is illustrated, a pair of shaft portions 8 protrudes from both end portions (both end portions in the axial direction) of the weight portions 7 that are connected to both axial-direction end portions of the magnet 4, where here one end side of the shaft portion 8 is inserted into, and secured in, a securing holes 7C that is provided in the weight portion 7.

The frame 2 is provided with respective bearing portions 3 that support the pair of shaft portions 8 so as to be able to slide. The pair of shaft portions 8 being supported on the bearing portions 3 so as to be able to slide enables the movable element 20 to be supported slidably on the frame 2. The bearing portions 3 may be formed integrally with the frame 2. Moreover, each bearing portion 3 may be structured from a bearing 3A and a bearing supporting member 3B, where the bearing supporting member 3B is attached to the bottom face 2A or a cover plate 2Q of the frame 2, and the bearing 3A is attached to a standing portion of the bearing supporting member 3B. Protruding attaching portions 2S, for positioning, are provided on the bottom face 2A or the cover plate 2Q of the frame 2, and the bearing supporting members 3B are attached to these attaching portions 2S.

A recessed portion 7A1 that has a width into which the bearing portion 3 can be inserted is formed along the axial direction (the X direction) in the end portion (the axial-direction end portion) 7A of the weight portion 7 from which the shaft portion 8 protrudes. The provision of such a recessed portion 7A1 makes it possible to keep the length of the linear vibration motor 1 short in the X direction, while still ensuring a large amplitude for the movable element 20.

Elastic members 9 are disposed off-axis from the pair of shaft portions 8, to apply, to the movable element 20, an elastic force that opposes the driving force of the driving portion 10. In the example that is illustrated, coil springs that extend and compress along the axial direction (the X direction) are used as the elastic members 9, where on two elastic members 9, one on each side are disposed between the weight portion 7 and the side wall 2B (2C).

In the example that is illustrated, the axis of the elastic members 9 is disposed so as to be parallel to the pair of shafts portions 8. Given this, one end of the elastic member 9 engages with a supporting protrusion 2P that is provided on the side wall 2B or 2C, and the other end of the elastic member 9 engages with a supporting protrusion 7A2 that is provided on the end portion 7A of the weight portion 7.

The operation of such a linear vibration motor 1 will be explained. When not driven, the movable element 20 stands still in the vibration center position wherein the elastic forces of the elastic members 9 are in equilibrium. When an electric current of a vibration generation signal is inputted into the coil 6, a driving force is applied to the magnet 4 in the X direction, and the movable element 20 undergoes reciprocating vibration along the axial direction through the driving force and the elastic repulsive force of the elastic member 9.

Given such a linear vibration motor 1, the pair of shafts portions 8 does not pass through the magnet 4, making it possible to secure a magnet volume that is able to produce an adequate driving force through a magnet 4 that is thin in the Z direction and wide in the Y direction, regardless of the diameter of the pair of shafts portions 8. This enables the production of a thin linear vibration motor 1 able to produce a sufficient driving force. In contrast, in a type wherein the stationary shaft passes through the magnet, as it does in the prior art, the thickness of the magnet must be quite large when compared to the stationary shaft in order to produce an adequate driving force, and is coiled therearound, making it difficult to reduce adequately the thickness when considering the diameter of the stationary shaft and the driving force.

Moreover, the linear vibration motor 1 according to an example according to the present invention, wherein the movable element 20 is supported by the pair of shaft portions 8 is able to reduce the width on the left and the right, because there is no need for space for placing the shafts on the left and right of the magnet 4, when compared to the prior art wherein stationary shafts are provided on both the left and the right sides of the magnet.

Moreover, in the linear vibration motor 1 according to the example of the present invention, the pair of shaft portions 8 do not interfere in any way with the magnet 4, making it possible to secure the magnet volume for producing an adequate driving force without dividing the magnet 4. This makes it possible to produce a linear vibration motor 1 wherein a movable element 20 is supported so as to be able to slide in a structure wherein there is no increase in the number of components of the magnet 4 and wherein it is possible to prevent a reduction in the volume of the magnet 4.

Furthermore, disposing the elastic members 9 off-axis in relation to the pair of shafts portions 8 enables a reduction in the diameter of the elastic members 9 regardless of the diameter of the pair of shafts portions 8. When the diameter of the elastic member 9 is reduced, the elastic force may be set arbitrarily through the selection of the material for the elastic members 9 and through providing many elastic members 9 in parallel. This can also reduce the thickness of a linear vibration motor 1 wherein a movable element 20 is supported on a shaft.

At this time, the movable element 20 that is supported by the pair of shaft portions 8 may rotate around the pair of shaft portions 8, and both the left and right side of the movable element 20 may rotate upward and downward. In contrast, a slide bearing portion 2R with which both the left and right sides of the movable element 20 make sliding contact is provided on the inner surface of the frame 2, and a sliding protrusion 7B for contacting the slide bearing portion 2R is provided on the surface of the weight portion 7 of the movable element 20. Given this, when the slide bearing portion 2R is formed from a resin material, or the like, this can preserve stabilized vibration through enabling suppression of the production of noise, or the like, when both sides of the movable element 20 contact inner surfaces of the frame 2. At this time, the slide bearing portion 2R may be provided on the weight portion 7 side, and the sliding protrusion 7B may be provided on the frame 2 side.

In this type of linear vibration motor 1, preferably the position of the magnet 4 that is connected to the weight portion 7 of the movable element 20 is disposed in the axial-direction center of the weight portion 7. Arranging the magnet 4 in this way causes the magnetic attraction that acts between the magnet 4 and the bottom face 2A of the frame 2, which is made from metal, to act uniformly on the left and on the right, enabling the vibration of the movable element 20 to be stabilized when compared to a case wherein the effect of the magnetic attraction is biased toward either the left or the right.

Figure 5:
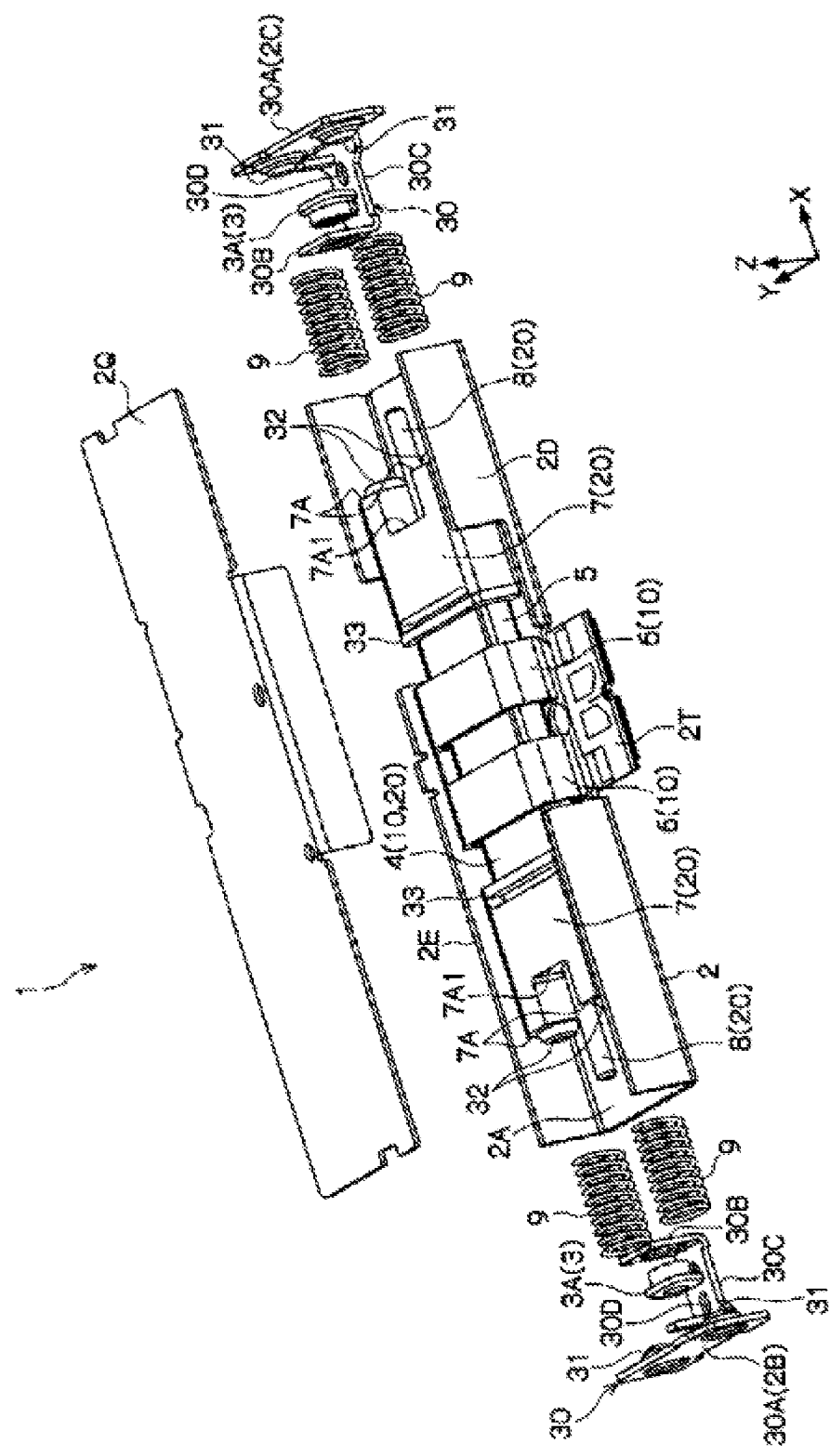
FIG. 5 is an assembly perspective diagram illustrating the overall structure of a linear vibration motor according to another example according to the present invention.
Figure 6:
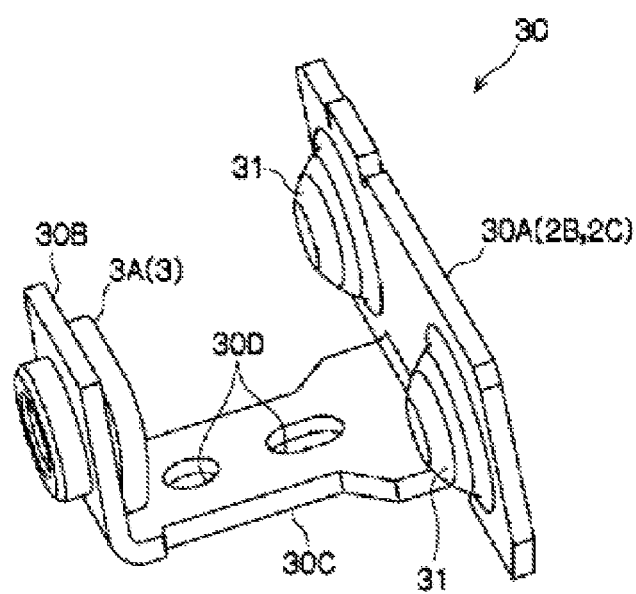
FIG. 6 is an explanatory diagram illustrating the critical portions of a linear vibration motor according to another example according to the present invention.
Figure 6:
Figure 7:
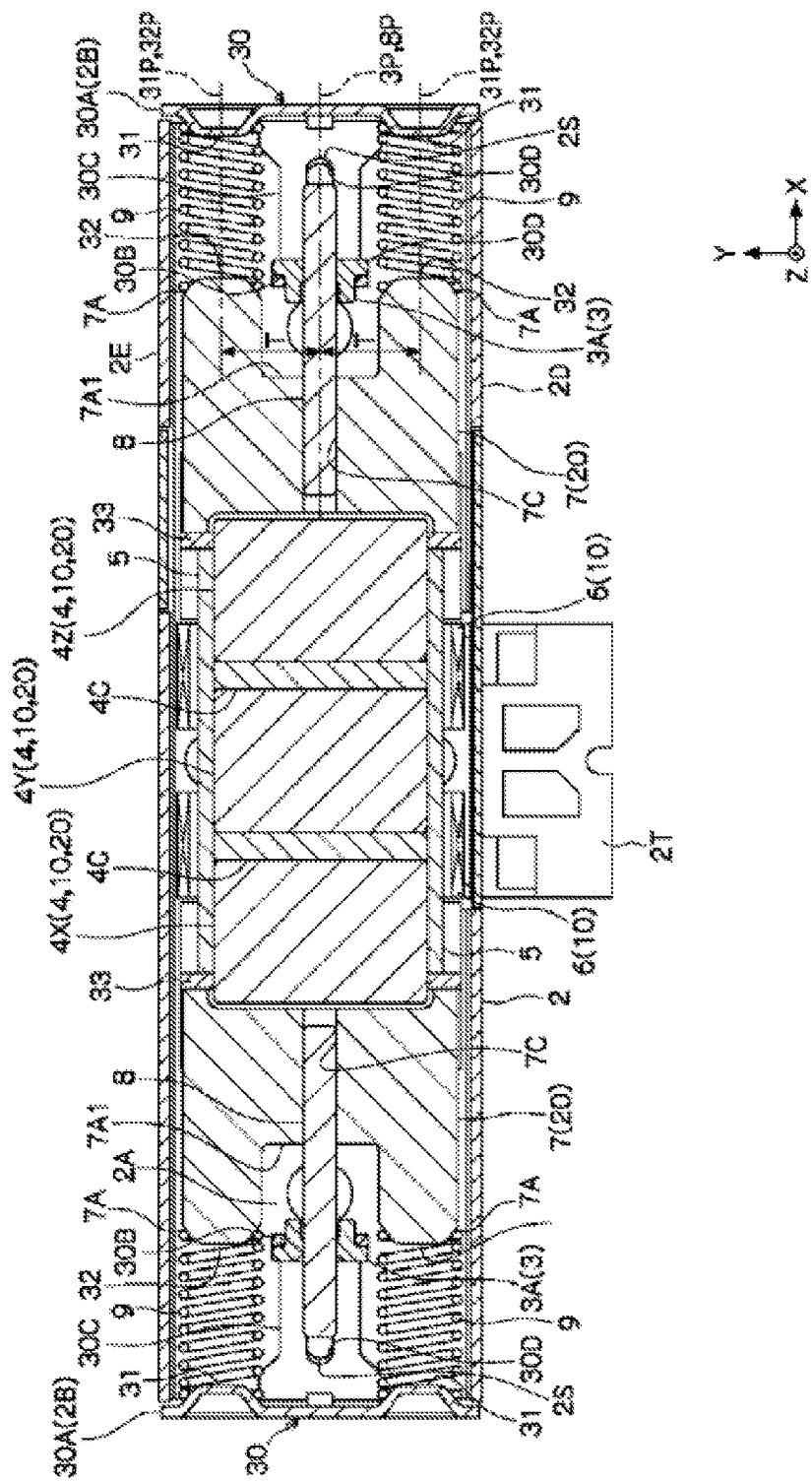
FIG. 7 is an explanatory diagram (an assembly cross-sectional diagram) illustrating the overall structure of a linear vibration motor according to another example according to the present invention.

FIG. 5 through FIG. 7 illustrate linear vibration motors according to other examples according to the present invention. The parts that are the same as that which has been explained above are assigned identical reference symbols, and redundant explanations are omitted. In this linear vibration motor 1, an attaching component 30, which is a single combined component, is provided as a portion of the frame 2. Through this, the frame 2 is provided with a stationary spring bearing portion 31 for supporting one end of the elastic member 9, where the bearing portion 3 and the stationary spring bearing portion 31 are provided in the attaching component 30, which is a single combined component.

The attaching component 30, which is a single combined component, is provided with a first plate piece part 30A, which serves as the side wall 2B for the side wall 2C of the frame 2, a second plate piece part 30B that is provided protruding from the bottom face 2A of the frame 2, and a connecting part 30C for connecting these together, as illustrated in FIG. 6. A stationary spring bearing portion 31 is provided in the first plate piece part 30A, and a bearing portion 3 (the bearing 3A) is provided on the second plate piece part 30B. The connecting part 30C of the attaching component 30 is provided with a hole portion 20D into which fits the attaching portion 2S that is provided protruding from the bottom face 2A of the frame 2.

The stationary spring bearing portion 31 is a protruding portion that protrudes toward the inside of the frame 2 from the first plate piece part 30A, and a pair thereof is arranged on both the left and the right sides of the bearing portion 3 so as to fit into the end portions of the pair of elastic members (coil springs) that are arranged on both the left and the right sides of the shaft portions 8. Moreover, the first plate piece part 30A that is provided with the pair of stationary spring bearing portions 31 and the second plate piece part 30B that is provided with the bearing portion 3 are connected by the connecting part 30C so that the axis of the bearing portion 3 crosses in the middle between the pair of stationary spring bearing portions 31.

Additionally, as illustrated in FIG. 7, a center 3P of a movable spring bearing portion 32 that supports the other ends of the elastic members 9 is provided at a distance that is separated, by a setting dimension T, from a center 8P of the shaft portion 8 at an end portion of the movable element 20 (the end portion 7A of the weight portion 7), where the center 32P of the bearing portion 3 and the center 31P of the stationary spring bearing portion 31 are, similarly, disposed at positions that are separated by the setting dimension T. Through this, the stationary spring bearing portion 31 and the movable spring bearing portion 32 are arranged coaxially, through being borne by the shaft portion 8 of the bearing portion 3, and, at the same time, the elastic members 9 are arranged in parallel with the shaft portion 8.

Here, in the example illustrated in FIG. 5 through FIG. 7, the magnet 4 is structured from three magnet pieces 4X, 4Y, and 4Z, where these are connected with spacer yokes 4C therebetween. The magnet pieces 4X, 4Y, and 4Z are magnetized along the axial direction of the shaft portion 8, where neighboring magnet pieces 4X and 4Y (and 4Y and 4Z) are magnetized in mutually opposing directions. Given this, two coils 6 are wound in series, and in mutually opposing directions, around the two spacer yokes 4C, and the end portions of the two coils 6 that are connected in series are connected to an input terminal portion 2T.

Magnet pieces 4X, 4Y, and 4Z, and the spacer yoke 4C, which are secured as a single combined unit by the reinforcing plate 5, are connected through a connecting member 33 to the weight portion 7. The provision of the connecting member 33 enables integration into a single unit through laser welding the magnet pieces 4X and 4Z, and the reinforcing plate 5, to the connecting member 33, and laser welding the weight portion 7 to the connecting member 33, without laser welding the magnet pieces 4X and 4Z, and the reinforcing plate 5, directly to the weight portion 7. Laser welding through the connecting member 33 in this way enables secure bonding, through laser welding, without any adverse effects of heat on the magnet pieces 4X and 4Z, even if the weight portion 7 is a metal material for which welding is difficult (wherein the melting point is high), such as tungsten alloy. Preferably a metal material is selected for the connecting member 33 so as to have a melting point that is between that of the metal material for the weight portion 7 and the metal material for the reinforcing plate 5 or the magnetic pieces 4X and 4Z.

In the linear vibration motor 1 illustrated in FIG. 5 through FIG. 7, the bearing portion 3 and the stationary spring bearing portion 31 can be positioned securely through merely attaching the attaching components 30 to the bottom face 2A of the frame 2, and the bearing portion 3 and the stationary spring bearing portion 31 are a single combined component, enabling an improvement in the positioning accuracy of the shaft portion 8 of the movable element 20 and the stationary spring bearing portion 31. Through this, in the linear vibration motor 1, the elastic members 9 and the shaft portions 8 can be arranged in parallel easily, and the rotational force, around the shaft portions 8, on the movable element 20 can be suppressed by the elastic forces of the elastic members 9, taking it possible to produce stabilized linear vibration.

As explained above, in the linear vibration motor 1 according to the present example of the present invention the movable element 20 vibrates supported by the pair of shafts portions 8, making it possible to produce a stabilized vibration and possible to produce resistance to damage when there is a drop impact, or the like, in the same manner as if a stationary shaft were provided. Additionally, such a linear vibration motor 1 can be made thinner and more compact in the width direction, while having no increase in the number of components of the magnet 4 and while suppressing a reduction in the volume of the magnet 4. Moreover, integrating the bearing portion 3 and the stationary spring bearing portion 31 into a single combined unit enables the elastic members 9 to be disposed with good balance, in relation to the shaft portions 8, easily, making possible to produce stabilized linear vibrations.

Figure 8:
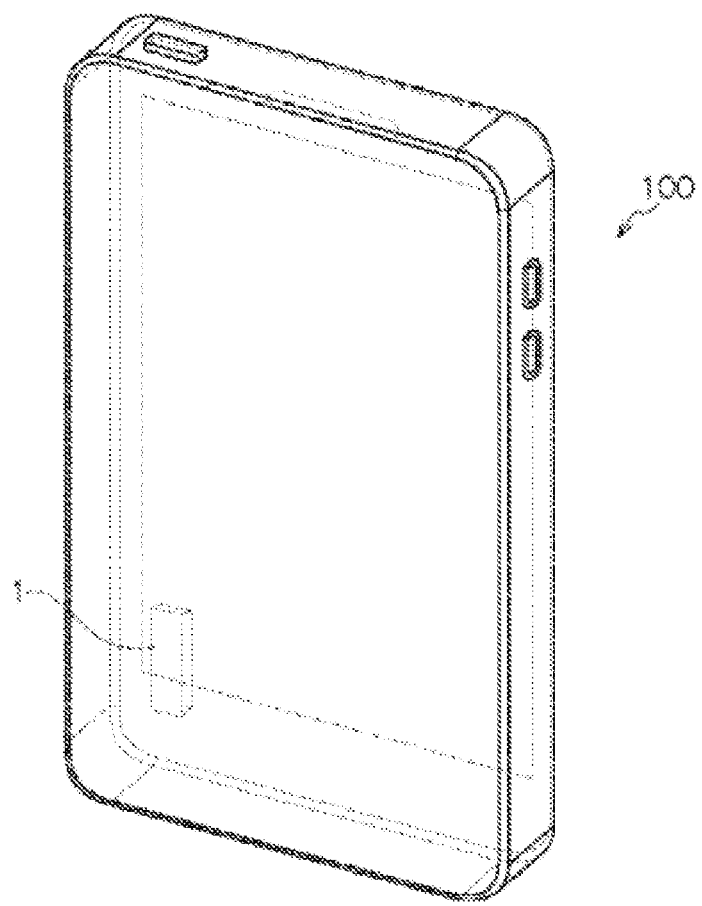
FIG. 8 is an explanatory diagram illustrating the electronic device (a mobile information terminal) equipped with a linear vibration motor according to an example according to the present invention.

FIG. 8 shows a mobile information terminal 100 as an example of an electronic device equipped with a linear vibration motor 1 according to an example according to the present invention. The mobile information terminal 100 that is equipped with the linear vibration motor 1 that can produce a stabilized vibration and for which the thickness can be reduced and which can be made more compact in the width direction enables the user to be notified through a stabilized vibration that does not tend to produce noise, when there is an incoming call in a communication function or at the beginning or end of an operation such as an alarm function. Moreover, this makes it possible to produce a mobile information terminal 100 with high mobility and which facilitates design performance, through the linear vibration motor 1 having reduced thickness and being more compact in the width direction. Furthermore, because the linear vibration motor 1 is of a compact shape wherein the various components are contained within a frame 2 of a rectangular shape wherein the thickness is suppressed, it can be mounted, with excellent space efficiency, within a thinner mobile information terminal 100.

While examples according to the present invention were described in detail above, referencing the drawings, the specific structures thereof are not limited to these examples, but rather design variations within a range that does not deviate from the spirit and intent of the present invention are also included in the present invention.

The invention claimed is:

1. A linear vibration motor comprising:
    a movable element comprises a magnet and a weight portion;
    a frame containing the movable element;
    a coil, secured to the frame, driving the magnet along an axial direction;
    an elastic member applying, to the movable element, an elastic force that opposes the driving force that is applied to the magnet,
    wherein the movable element further comprises a pair of shaft portions that protrude in mutually opposing directions along the axial direction,
    wherein the frame further comprises respective bearing portions that support the pair of shaft portions so as to be able to slide,
    wherein the frame further comprises a stationary spring bearing portion supporting one end of the elastic member; and the bearing portion and the stationary spring bearing portion are provided in a single combined component,
    wherein the single combined component is provided with a first plate piece part that serves as a side wall of the frame, and a second plate piece part that is provided extending from the bottom face of the frame; and the stationary spring bearing portion is provided on the first plate piece part and the bearing portion is provided on the second plate piece part.

2. A linear vibration motor comprising:

a movable element comprises a magnet and a weight portion;

a frame containing the movable element;

a coil, secured to the frame, driving the magnet along an axial direction;

an elastic member applying, to the movable element, an elastic force that opposes the driving force that is applied to the magnet, wherein the movable element further comprises a pair of shaft portions that protrude in mutually opposing directions along the axial direction, wherein the frame further comprises respective bearing portions that support the pair of shaft portions so as to be able to slide, wherein the frame further comprises a stationary spring bearing portion supporting one end of the elastic member, and the bearing portion and the stationary spring bearing portion are provided in a single combined component; and a movable spring bearing portion supporting the other end of the elastic member and provided at an end portion of the movable element at a position that is separated, by a setting dimension, from the shaft portion, wherein the bearing portion and the stationary spring bearing portion are provided at positions that are separated by the setting dimension.

3. A linear vibration motor comprising:

a movable element comprises a magnet and a weight portion;

a frame containing the movable element;

a coil, secured to the frame, driving the magnet along an axial direction; and an elastic member applying, to the movable element, an elastic force that opposes the driving force that is applied to the magnet, wherein the movable element further comprises a pair of shaft portions that protrude in mutually opposing directions along the axial direction; and wherein the frame further comprises respective bearing portions that support the pair of shaft portions so as to be able to slide, wherein the weight portion is connected to both axial-direction end portions of the magnet and the pair of shaft portions protrude from both axial-direction end portions of the weight portions, wherein a recessed portion having a width that enables insertion of the bearing portion is formed along the axial direction in an end portion of the weight portion from which the shaft portion protrudes.

* * * * *